US012654875B2

(12) United States Patent
Wyrembek et al.

(10) Patent No.: US 12,654,875 B2
(45) Date of Patent: Jun. 16, 2026

(54) MONITORING ADAPTABLE SEGMENTS OF AN AIRFOIL

(71) Applicant: Airbus Operations GmbH, Hamburg (DE)

(72) Inventors: Jörg Wyrembek, Delmenhorst (DE); Lynn Janning, Hamburg (DE); Sarah Dehnbostel, Hamburg (DE); Christoph Naue, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 168 days.

(21) Appl. No.: 18/609,170

(22) Filed: Mar. 19, 2024

(65) Prior Publication Data

US 2024/0317420 A1     Sep. 26, 2024

(30) Foreign Application Priority Data

Mar. 23, 2023     (EP) .................................... 23163876

(51) Int. Cl.
  B64D 45/00     (2006.01)
  B64C 9/26     (2006.01)
(52) U.S. Cl.
  CPC ............ B64D 45/0005 (2013.01); B64C 9/26 (2013.01); B64D 2045/001 (2013.01)
(58) Field of Classification Search
  CPC .. B64D 45/0005; B64D 2045/001; B64C 9/26
  See application file for complete search history.

(56) References Cited

U.S. PATENT DOCUMENTS

| | | | | |
|---|---|---|---|---|
| 5,628,477 A | * | 5/1997 | Caferro | .............. B64D 45/0005 244/214 |
| 5,680,124 A | * | 10/1997 | Bedell | ................ B64D 45/0005 324/207.13 |
| 6,382,566 B1 | | 5/2002 | Ferrel | |
| 2005/0151027 A1 | | 7/2005 | Recksiek | |
| 2008/0265090 A1 | * | 10/2008 | Schievelbusch | ... B64D 45/0005 244/99.3 |

FOREIGN PATENT DOCUMENTS

DE     102013104009 A1     10/2013

OTHER PUBLICATIONS

European Search Report for Application No. 23163876 dated Sep. 8, 2023.

* cited by examiner

*Primary Examiner* — Richard G Davis
(74) *Attorney, Agent, or Firm* — KDW Firm PLLC

(57)     ABSTRACT

To provide an improved monitoring, a monitoring arrangement for adaptable segments of an airfoil includes sensor cable segments, cable connections, and a signal data processor. The sensor cable segments are each configured to be attached between adjacent adaptable segments and to detect a spatial relative movement of the adjacent adaptable segments and to generate a signal representing the relative movement. The cable connections are configured to supply the signals of the sensor cable segments to the data processor. The data processor is configured to determine relative changes in a spatial arrangement of the adaptable segments based on the supplied signals.

21 Claims, 3 Drawing Sheets

MONITORING ADAPTABLE SEGMENTS OF AN AIRFOIL

TECHNICAL FIELD

The disclosure herein relates to adaptable segments of an aircraft, like slats or flaps, and relates in particular to a monitoring arrangement for a plurality of adaptable segments of an airfoil, to an adaptable surface configuration for an airfoil, to an airfoil, to an aircraft and to a method for monitoring a plurality of adaptable segments of an airfoil.

BACKGROUND

For changing flight behavior of an aircraft, e.g. in order to optimize the characteristics for certain flight stages, adaptable segments of an airfoil may be provided on airfoils and other aerodynamic effective surfaces. For example, for operation during a landing phase, slats are provided along leading edges, which slats can be deployed to allow lower speeds for a landing phase. However, monitoring of the proper functioning is required, which may mean extra components leading to higher costs and increase in weight.

SUMMARY

There may thus be a need for improved monitoring of adaptable segments of an airfoil.

The object of the disclosure herein is solved by the subject matter and embodiments herein. It should be noted that the following described aspects of the disclosure herein apply also for the monitoring arrangement for a plurality of adaptable segments of an airfoil, for the adaptable surface configuration for an airfoil, for the airfoil, for the aircraft and for the method for monitoring a plurality of adaptable segments of an airfoil.

According to the disclosure herein, a monitoring arrangement for a plurality of adaptable segments of an airfoil is provided. The arrangement comprises a plurality of sensor cable segments, a plurality of cable connections and a signal data processor. The sensor cable segments are each configured to be attached between adjacent adaptable segments of the plurality of the adaptable segments. The sensor cable segments are each also configured to detect a spatial relative movement of the adjacent adaptable segments and to generate a signal representing the relative movement. The cable connections are configured to supply the signals of the sensor cable segments to the data processor. The data processor is configured to determine relative changes in a spatial arrangement of the plurality of adaptable segments based on the supplied signals.

As an effect, a monitoring setup is provided that has a reduced number of parts and that is easy to operate. By detecting changes of the spatial relation of the adaptable segments, knowledge can be derived if a malfunctioning occurs. If, for example, all adaptable segments are supposed to move uniformly, the spatial relation of the adaptable segments should remain during movement. Of course, the mechanism may show some tolerance ranges which can be taken into account regarding the detection of changes in the spatial relation. If, for example, a selected number of the adaptable segments are supposed to move, but others should remain, the spatial relation of the adaptable segments should change according to a targeted change. If the detected change does not match this expected change, a malfunctioning can be derived.

According to an example, at least a part of the cable connections is provided as interconnecting cable segments, which are configured to be arranged between two sensor cable segments in order to connect successive sensor cable segments for the connection to the data processor.

According to an example, the sensor cable segments each comprise a plurality of consecutive sensors that detect relative movements of determined consecutive points along a longitudinal extension of the sensor cable segments. The sensors are configured to detect a relative motion of the two ends of a sensor cable segment.

According to an example, each of the sensor cable segments comprises a first and a second sensor segment arranged in a common cable shielding.

According to an example, at least a part of the cable connections is provided as a second plurality of second sensor cable segments. The second sensor cable segments are each configured to be attached to one of the adaptable segments and to detect a spatial deforming of the respective adaptable segment and to generate a second signal representing the spatial deforming of the respective adaptable segment.

According to the disclosure herein, also an adaptable surface configuration for an airfoil is provided. The configuration comprises a plurality of adaptable segments mountable to a support structure of an airfoil, a mechanism for changing locations or shapes of the adaptable segments in relation to the support structure and a monitoring arrangement according to one of the examples above. The sensor cable segments of the monitoring arrangement detect relative movement between adjacent segments of the plurality of the adaptable segments.

According to the disclosure herein, also an airfoil is provided. The airfoil comprises a support structure and an adaptable surface configuration for an airfoil according to the previous example with a monitoring arrangement according to one of the examples above. The plurality of adaptable segments is mounted to the support structure. At least a part of the airfoil is adjustable in its aerodynamically effective geometry based on the changes of the adaptable segments.

According to an example, the adaptable segments are slats arranged along at least a part of a leading edge of the airfoil. The moving mechanism comprises a plurality of actuators for moving the slats between a retracted position and a deployed position. The monitoring arrangement is a slat skew monitoring system.

According to an example, the adaptable segments are flaps arranged in rows or row segments along a trailing edge of the airfoil. The moving mechanism comprises a plurality of actuators for moving the flaps between a retracted position and a deployed position. The monitoring arrangement is a flap monitoring system.

According to the disclosure herein, also an aircraft is provided. The aircraft comprises a fuselage and at least one airfoil according to one of the preceding examples with an adaptable surface configuration for an airfoil according to the example above that comprises a monitoring arrangement according to one of the examples above. The at least one airfoil is mounted to the fuselage.

According to the disclosure herein, also a method for monitoring a plurality of adaptable segments of an airfoil is provided. The method comprises the following steps:

Detecting spatial relative movements of adjacent adaptable segments of the plurality of adaptable segments with sensor cable segments of a plurality of sensor cable segments that are attached between the adjacent adaptable segments of the plurality of the adaptable segments;

Generating signals representing the relative movements;

Supplying the signals of the sensor cable segments to the data processor with a plurality of cable connections; and Determining, based on the supplied signals, relative changes in a spatial arrangement of the plurality of adaptable segments with a signal data processor.

According to an aspect, it is provided to 'cut' a sensor arrangement into segments such that there are flexible sensor parts and interconnecting wiring that connect all the flexible sensor cable segment parts. The sensor segments provide targeted spatial measurement only where relative movement are most likely to occur, e.g. between adjacent adaptable segments.

These and other aspects of the disclosure herein will become apparent from and be elucidated with reference to the embodiments described hereinafter.

BRIEF DESCRIPTION OF THE DRAWINGS

Example embodiments of the disclosure herein will be described in the following with reference to the following drawings.

DETAILED DESCRIPTION

Figure 1:
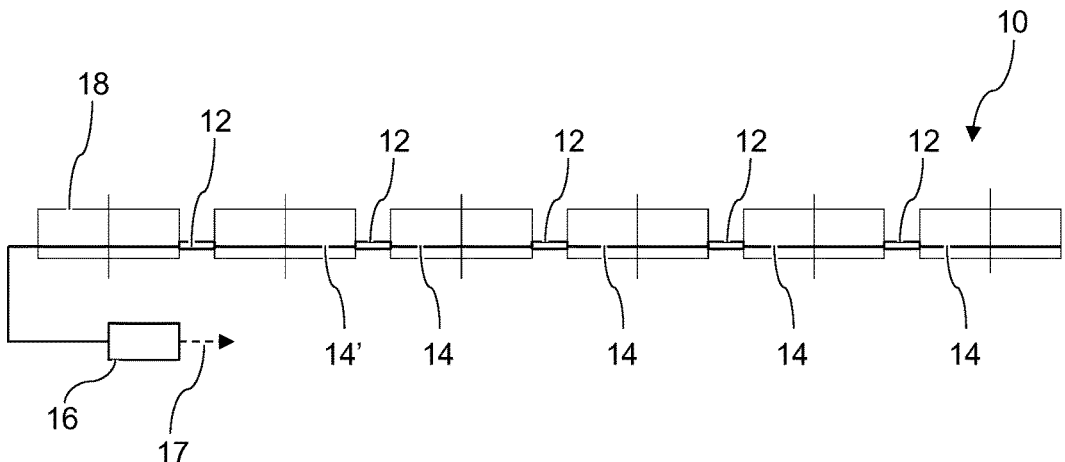
FIG. 1 schematically shows an example of a monitoring arrangement for a plurality of adaptable segments of an airfoil.

Certain embodiments will now be described in greater details with reference to the accompanying drawings. In the following description, like drawing reference numerals are used for like elements, even in different drawings. The matters defined in the description, such as detailed construction and elements, are provided to assist in a comprehensive understanding of the example embodiments. Also, well-known functions or constructions are not described in detail since they would obscure the embodiments with unnecessary detail. Moreover, expressions such as "at least one of", when preceding a list of elements, modify the entire list of elements and do not modify the individual elements of the list.

FIG. 1 schematically shows an example of a monitoring arrangement 10 for a plurality of adaptable segments of an airfoil. The monitoring arrangement 10 comprises a plurality of sensor cable segments 12, a plurality of cable connections 14 and a signal data processor 16. The sensor cable segments 12 are each configured to be attached between adjacent adaptable segments of the plurality of the adaptable segments. The sensor cable segments 12 are also each configured to detect a spatial relative movement of the adjacent adaptable segments and to generate a signal representing the relative movement. The cable connections 14 are configured to supply the signals of the sensor cable segments 12 to the data processor 16. The data processor 16 is configured to determine relative changes in a spatial arrangement of the plurality of adaptable segments based on the supplied signals. In FIG. 1, the adaptable segments are indicated as an option with broken line frames 18.

The monitoring arrangement 10 can also be referred to as a monitoring arrangement for configurations of the plurality of adaptable segments of the airfoil.

Such monitoring arrangement is useful for e.g. certification regulations for aircrafts that require a solution for detecting skew cases of the movable parts e.g. in leading edge high lift systems. The term "skew" relates to all kind of deviations from a target movement or change of the adaptable elements.

The term "adaptable segments" relates to segments that can change their location or position, or to segments that can change their shape or contour. As an example, the adaptation can be provided for operation of an aircraft during predetermined flight mission situations or stages, such as during starting or landing phases or taxiing phases. Besides moving rigid parts, also deformable parts can be provided as adaptable segments.

The term "adjacent" relates to neighboring segments, i.e. the next segment when viewed along an extension direction of the adaptable segments. The term adjacent relates to segments that are arranged next to each other, e.g. distanced by a gap.

The term "sensor cable segments" relates to segments that provide sensor functions. The sensor cable segments 12 are provided cable-like, i.e. as longitudinal extending segments with at least a certain flexibility in a bending direction.

The term "cable connections" relates to providing connections in form of cables, i.e. as longitudinal extending connecting elements with at least a certain flexibility in a bending direction. The cable connections 14 provide data transfer of electrical signals, or also electromagnetic signals like light waves.

The term "data processor" relates to any kind of processor or circuit that is further processing the collected data in form of the signals stemming from the sensors. The data processor 16 may be a separate processor or may be integrated in a central processor of the aircraft.

The term "attached between" relates to mounting, i.e. temporarily fixing the sensor cable segments 12 such that they are arranged between the adjacent adaptable segments.

The term "to detect a spatial relative movement" relates to identifying a spatial relative movement. The detection or identification may take place in a more qualitative manner, i.e. provide information if there is a movement above a certain threshold, or in a quantitative manner, i.e. determining the actual dimension of the movement.

The term "supply the signals" relates to forwarding, i.e. conducting or transmitting the signals.

The data processor 16 is also configured to provide the determined relative changes as data to further steps (indicated with broken line arrow 17), like data processing, or adaptation steps or modifications in an operation scheme of an aircraft or for triggering maintenance or repair or for achieving adjustment measures to at least partly compensate the detected (and unwanted) changes.

The sensor cable segments 12 are attached to the adjacent adaptable segments to span a distance between the adjacent adaptable segments.

The sensor cable segments 12 provide a modern detection system with an assumed limited number of necessary interfaces for e.g. a flight control computer (FCC). Also, the number of necessary wiring in the slat/wing is limited. As the sensor is an electronic device, it has the ability to be continuously monitored for the occurrence electrical failures. Malfunctioning on e.g. the slat actuation system can be exactly identified due to the ability of every flexible sensor cable part or segment to detect an abnormal cable movement out of the allowed area.

In an example, the plurality of the sensor cable segments 12 is provided in form a number of small sensor cable-like detection system of a rather small length which is able to provide a three-dimensional position projection of every individual sensor part to a computer system.

In an example, basically each sensor cable segment 12 provides a sensor that comprises a flexible core, a flexible printed circuit board (PCB) including signal driver electronic and e.g. optical emitter and detector elements populated at the edge of the flexible PCB. The sensor also comprises a cable shielding. As the signal from every emitter/detector pair is made available in a computerized system, any three-dimensional position variation of every cable part can be detected and represented. Thus, the sensor cable segments 12 provide the ability to detect position, shape and interaction.

In another option, the sensor cable part or segment is populated with more sensors than needed for the applications. This provides a failure tolerant sensor system which still performs its duty after the occurrence of electrical failures. Thus, sensor failures require no immediate maintenance action and can be scheduled to a more convenient time.

The airfoil can also be referred to as aerodynamic surface or aerodynamic effective surface. An example of an airfoil is a wing with its upper and lower surface and its edges, e.g. leading and trailing edge.

In an example, the sensor cable segments 12 are each configured to be attached to cable mounts on the adaptable segments to span the distance between the adjacent adaptable segments of the plurality of the adaptable segments. The sensor cable segments 12 are each configured to detect a spatial relative movement of the adjacent adaptable segments and to generate a signal representing the relative movement.

In an example, a high lift system comprises slat skew monitoring of all single load path slat architectures. For example, a slat system is provided that provides knowledge about the exact location along a load path, instead of providing a single load path model. An approach is provided for monitoring in order to prevent occurrence of hidden failures.

The present solution not only provides a change of a relative spatial arrangement of the adaptable segments in a change of the distance, but also a change in rotational arrangement. The sensor cable segments 12 replace a plurality of sensors, like proximity sensors or angular sensors.

An example for monitoring configurations of a plurality of adaptable segments of an airfoil is the detection of a slat skew. As a slat is usually comprising a plurality of adaptable elements, some of the drive mechanism may fail leading to skew, i.e. where one or more of the adaptable elements are not aligned with the rest of the adaptable elements. In other words, such failure may have an impact of the effective forming of the leading edge of a wing or other airfoil structure where such adaptable elements are provided.

As an example, a slat down drive disconnect-through drive maintained (DDD-TDM) failure resulting in actuator jamming may lead to a slat skew of the concerned panel and thus to a position change of the neighboring slat panel edges.

The jammed actuator stops and holds the slat in place, while the other drive stations still move the panels in extend or retract direction.

As the sensor cable segments 12 are able to detect position change and interaction, the arrangement, also referred to as sensor system, may serve to detect the critical failure. The sensor cable segments 12 are connected between adjacent slat panel edges of the slat panel and provide their data via an interface box to the connected FCC. After failure confirmation, the FCC can perform an abnormal shut down of an initiated slat drive sequence (extend or retraction) and apply LH/RH wing tip brakes.

According to an option, at least a part of the cable connections 14 is provided as interconnecting cable segments 14', which are configured to be arranged between two sensor cable segments 12 in order to connect successive sensor cable segments 12 for the connection to the data processor 16.

This provides a consecutive sequence of sensing parts followed by non-sensing parts in an alternating manner.

In such an alternating cable scheme, the sensor cable segments 12 are also configured for data transmission, e.g. by being provided with a data-bus transfer line.

In an option, the part of the cable connections 14 that is provided as interconnecting cable segments are arranged between two sensor cable segments 12 connecting successive sensor cable segments 12 for the connection to the data processor 16.

Thus, a chain of fixed and flexible parts is provided. The fixed parts are interconnecting wiring between the flexible parts. Such a sensor system can be established such that the evaluation logic differentiates between flexible and fixed parts. Connected to an interface box, this provides a sensor system with only two data bus interfaces (e.g. LH/RH slat skew detection sensor chains) to the FCC.

In an example, the interconnecting cable segments are installed in the slat panels such that the arrangement runs through all slats on starboard and port.

According to an option, the plurality of the cable connections 14 is used for connecting the sensor cable segments 12 to the data processor 16. In an additional option, the cable connections 14 connect the sensor cable segments 12 to a common data bus connection to the data processor 16.

The cable connections 14 are arranged in a parallel connection scheme.

According to an option, the sensor cable segments 12 each comprise a plurality of consecutive sensors (not shown) that detect relative movements of determined consecutive points along a longitudinal extension of the sensor cable segments 12. The sensors are configured to detect a relative motion of the two ends of a sensor cable segment.

This allows to detect a relative motion or movement of two adjacent adaptable segments. Thus, a detection of a malfunctioning adaptable segment can be detected.

In an example, the sensor cable segments 12 are provided based on the detecting cable provided in DE 10 2013 104009 A1.

In an example, the data processor 16 is a flight control computer.

As a monitoring example principle, the sensor cable segments 12 are provided based on the innovative cable sensor (Innovativer Kabelsensor—INKA) available from TST Teichert Systemtechnik GmbH, Lilienthal, Germany. In an example, the INKA is connected between adjacent slat panel edges of the slat panels and provides its data via an interface box to the connected flight control computer (FCC).

However, it is noted that also other sensor types are provided, if they are capable of being connected between two adjacent adaptable elements and to detect changes in the relative spatial arrangement.

In another example, every sensor cable segment 12 is connected to an interface box which collects and conditions the individual sensor data and provides the FCC via an adequate bidirectional data bus with the required position data of the individual flexible sensor cable segments 12 parts.

The sensor cable segments 12 are able to detect position change and to detect deviations from standard functioning of the adaptable segments. For example, with slats, the sensor cable segments 12 are able to detect so-called slat down drive disconnect-through drive maintained (DDD-TDM) failure.

As the sensor cable segments 12 along the airfoil determine the individual positions precisely, a three-dimensional position corridor around the flex sensor cables can be defined in an adequate monitoring of an FCC. The corridor includes installation tolerances as well as slat vibration when operated. For an intact slat system, the corridor moves with the slat position because the slats are operated simultaneously in or out. Leaving the OK corridor is then detected in the computer followed by the necessary actions (such as shutdown of drive sequence, applying wing tip brakes (WTBs), warnings etc.). Thus, a DDD-TDM failure can be detected using the sensor cable segments 12.

As an example, a DDD-TDM failure with actuator jam leads to undesired slat skew if the slats are extended or retracted. The resulting position change of the concerned adjacent slap panel edges provides an opportunity for electronic detection.

In view of the large amount of slat panels to be monitored with a computerized detection system, a significant reduction of required sensors or sensor interfaces is provided by applying the sensor cable segments 12. This minimizes the cost for the required equipment, its installation effort, and also reduces the system equipment weight and benefits the overall system reliability.

In an example, the sensor cable arrangement, e.g. the INKA sensor system, is installed in the slat panels such that the INKA cable, i.e. the segments and the cable connections 14 in an alternating manner, run through all slats for both sides, i.e. starboard (also referred to as right or right hand side, RH) and port (also referred to as left or left hand side, LH).

According to an option (not shown), each of the sensor cable segments 12 comprises a first and a second sensor segment arranged in a common cable shielding.

Each sensor cable segment 12 is thus provided as double sensing segment. This provides a redundancy contributing to further system safety and reliability. Each sensor cable segment 12 provides redundant measurement of a relative movement.

The term "common shielding" relates to providing a shielding for housing or at least partly enclosing the two sensor segments.

The two sensor segments can be provided as the sensor cable segments 12 described above but arranged within one shielding or enclosure.

According to an option, the sensor cable segments 12, and the cable connections 14 provide a linear arrangement configured to be arranged along an adaptable edge of an airfoil.

The term "linear arrangement" relates to the sensor cable segments 12 provided in a row, only separated by the cable connections 14. The arrangement may be curved or inclined with one or more angles, e.g. following a contour of an airfoil like a wing or wing section (when a wing has movable parts) or wing portion (when a wing has different areas with different additional technical means like the adaptable elements).

In an option, the sensor cable segments 12 are configured to provide individual detections of the spatial relative movement. In another option, the sensor cable segments 12 as a series connection configured to provide a global detection of the spatial relative movement for the sensor cable segments 12.

According to an option, at least a part of the cable connections 14 is provided as a second plurality of second sensor cable segments 12. The second sensor cable segments 12 are each configured to be attached to one of the adaptable segments and to detect a spatial deforming of the respective adaptable segment and to generate a second signal representing the spatial deforming of the respective adaptable segment.

The term "spatial deforming" relates to a change of the form of the movable adaptable segment in itself, such as a bending of a slat or flap.

The second sensor cable segments 12 are provided to separately span across an adaptable segment.

This allows to detect a deformation of the adaptable segments, while also allowing to detect the position of the deformed adaptable segment. This further improves accuracy of the knowledge of the current state across the adaptable portions of the airfoil.

In an example, the sensor cable segments 12 are installed in the slat panels such that the arrangement runs through all slats on starboard and port.

In an example, the sensor cable segments 12 between two adjacent adaptable segments are provided as main or primary sensor cable segments 12. The sensor cable segments 12 are spanning across the adaptable segments are provided as side or secondary sensor cable segments 12.

In an option, the primary sensor cable segments 12 are provided with a different sensing setup then the secondary sensor cable segments 12. In an example, the primary sensor cable segments 12 have a higher accuracy in detecting relative movement of the respective end parts of the sensor cable segments 12. In another example, the primary sensor cable segments 12 are provided with redundant sensing along the length, whereas the secondary sensor cable segments 12 are provided without such redundancy.

In an example of the monitoring arrangement, the data processor 16 is configured to apply a threshold filtering to the deviation determination.

As an example, this takes into account an acceptable relative movement due to constructive tolerances or other system immanent causes.

Figure 2A:
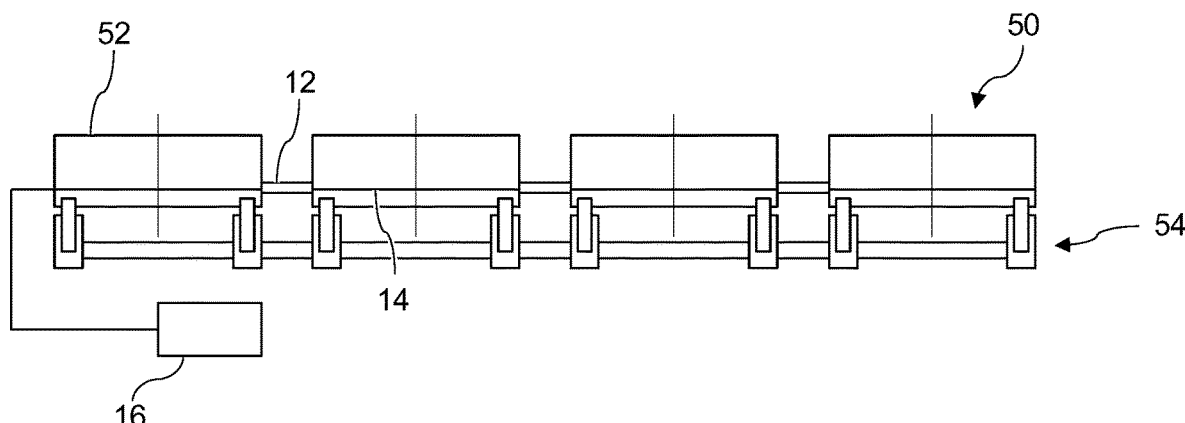
FIG. 2a schematically shows an example of an adaptable surface configuration for an airfoil.
Figure 2B:
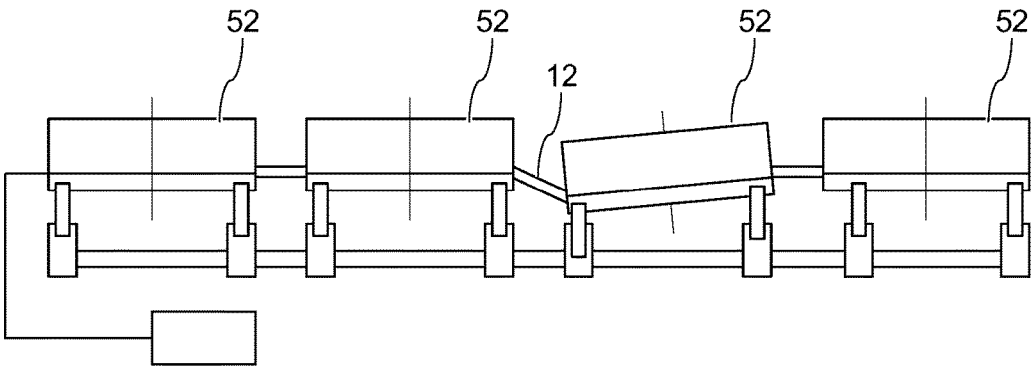
FIG. 2b schematically shows the example of FIG. 2a with a skewed adaptable segment in form of a slat in a row of deployed adaptable segments.

FIG. 2*a* and FIG. 2*b* schematically show an example of an adaptable surface configuration 50 for an airfoil. The configuration 50 comprises a plurality of adaptable segments 52 mountable to a support structure (not shown) of an airfoil. A mechanism 54 for changing locations or shapes of the adaptable segments 52 in relation to the support structure. Further, an example of the monitoring arrangement 10 according to one of the preceding examples and options is provided. The sensor cable segments 12 of the monitoring arrangement 10 detect relative movement between adjacent segments of the plurality of the adaptable segments 52.

While FIG. 2*a* shows the adaptable segments 52 being moved in a synchronous way, FIG. 2*b* shows the adaptable segments 52 being moved, but with one actuator malfunctioning, e.g. the adaptable segment being skewed.

The term "mechanism for changing locations or shapes" relates to different components provided for achieving the changes. The mechanism 54 can comprise drives for generating driving forces and force transmission components like driveshafts or any gear mechanism.

In an example, the mechanism 54 comprises a drive, e.g. an electric motor, or an electromagnetic drive or a pneumatic drive. In one example, a drive is provided for each of the adaptable elements; in another example, a drive is provided for a group of the adaptable elements. In a further example, force transmission elements like rods, drive shafts, cables or the like are provided. Still further, gear devices can be provided to transform the movement of the drive into the desired movement of the adaptable elements.

In an example, the adaptable segments 52 are movably mounted to the support structure.

In another example, the adaptable segments 52 are fixedly mounted to the support structure, but adaptable in themselves.

Figure 3:
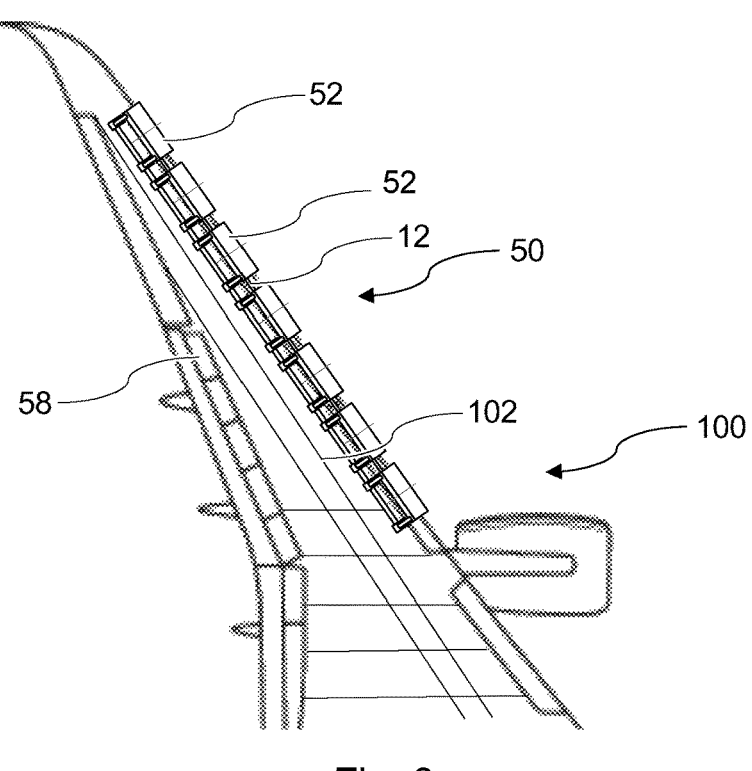
FIG. 3 shows an example of an airfoil.

FIG. 3 shows an example of an airfoil 100. The airfoil 100 comprises a support structure 102 (shown partly and in a simplified manner in broken lines) and an example of the adaptable surface configuration 50 for an airfoil according to the previous example with an example of the monitoring arrangement 10 according to one of example above and below. The plurality of adaptable segments 52 is mounted to the support structure 102. At least a part of the airfoil 100 is adjustable in its aerodynamically effective geometry based on the changes of the sensor cable segments 12.

In an example, the adaptable segments 52 are movably mounted to the support structure and the sensor cable segments 12 detect relative movement between adjacent segments of the plurality of the adaptable segments 52 during operation of an aircraft comprising the airfoil.

The term "support structure" relates to components within an airfoil that transfer loads and that provide stability of the airfoil. An example are ribs, frames, arms, box-type parts that are provided within the airfoil. For example, the support structure is a wing structure. An example for a support structure is a longitudinally extending strut or spar with crosswise running members.

In an example, the adaptable segments 52 are assumed to be rigid and stiff.

In an example, the moving mechanism 54 comprises actuators to change a location of the adaptable segments 52, like causing a rotational or translational movement or a combination thereof. For example, the adaptable segments 52 are mounted or supported to be movable between two different positions.

In another example, the moving mechanism comprises actuators to change a shape of the adaptable segments 52, like causing a change of its outer surface or deformation of its outer contour or form. For example, the adaptable segments 52 are changeable between two different conditions or states.

According to an option, a cable connection is provided along each of the adaptable segments 52. The interconnecting cable segments are so-to-speak bridging the adaptable segments 52.

According to an option, the sensor cable segments 12 are attached to adjacent adaptable segments to span a distance between the adjacent adaptable segments of the plurality of the adaptable segments 52. The sensor cable segments 12 are each configured to detect a spatial relative movement of the adjacent adaptable segments and to generate a signal representing the relative movement. The cable connections 14 each supply the signals of the sensor cable segments 12 to the data processor 16. The data processor 16 determines a deviation of a spatial arrangement of the plurality of adaptable segments 52 based on the supplied signals.

According to an option, the adaptable segments 52 are slats 56 arranged along at least a part of a leading edge of the airfoil. The moving mechanism comprises a plurality of actuators for moving the slats 56 between a retracted position and a deployed position. The monitoring arrangement is a slat skew monitoring system.

In an example, each slat is operated, i.e. moved, by a pair of actuators.

As an example, the actuators are operated by a common drive. For example, the actuators are provided as gear mechanism for translating a rotational movement of a common drive shaft into a sliding or pivoting movement of the slats.

In an example, the actuators are power drives for moving the slats.

The slats can also be referred to as slat segments or slat parts.

The deployed position can also be referred to as extended position.

In an example, the sensor cable segments 12 are spanning between two adjacent slats. As an example, the sensor cable segments 12 are attached to the lateral end surfaces of the slats.

In another option, the adaptable segments 52 are provided as droop leading edge flaps. The droop leading edge flaps can also be referred to as or droop noses.

According to an option, also shown in FIG. 3 as an additional or alternative option, the adaptable segments 52 are flaps 58 arranged in rows or row segments along a trailing edge of the airfoil. The moving mechanism comprises a plurality of actuators for moving the flaps between a retracted position and a deployed position. The monitoring arrangement is a flap monitoring system.

In an option, the adaptable segments 52 are provided as slotted flaps.

In another option, the adaptable segments 52 are provided as Fowler flaps.

In a further option, the adaptable segments 52 are provided as split flaps.

Figure 4:
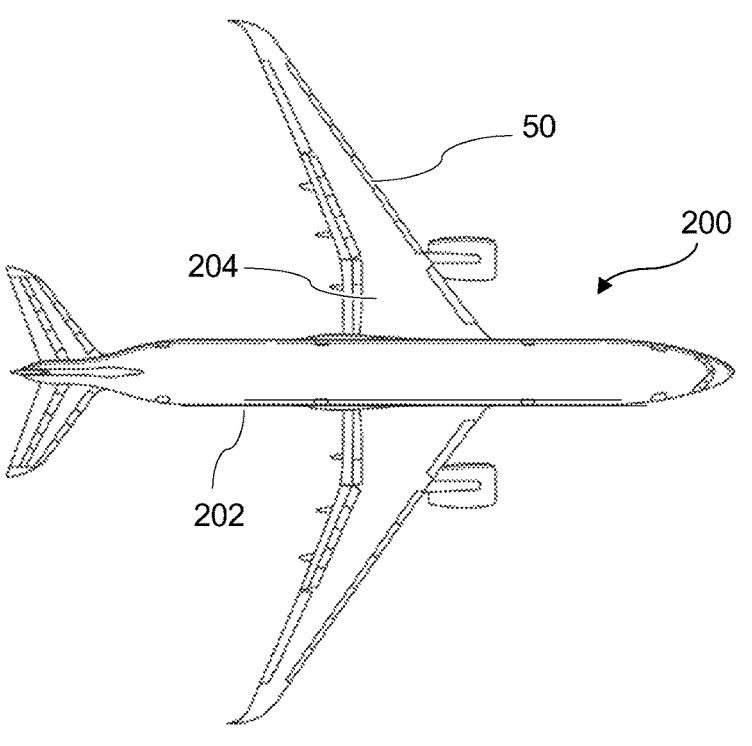
FIG. 4 shows an example of an aircraft.

FIG. 4 shows an example of an aircraft 200 comprising a fuselage 202 and at least one airfoil 204 according to one of the examples above with an example of the adaptable surface configuration 50 for an airfoil according to the example above that comprises an example of the monitoring arrangement 10 according to one of the examples above. The at least one airfoil 204 is mounted to the fuselage 202.

Figure 5:
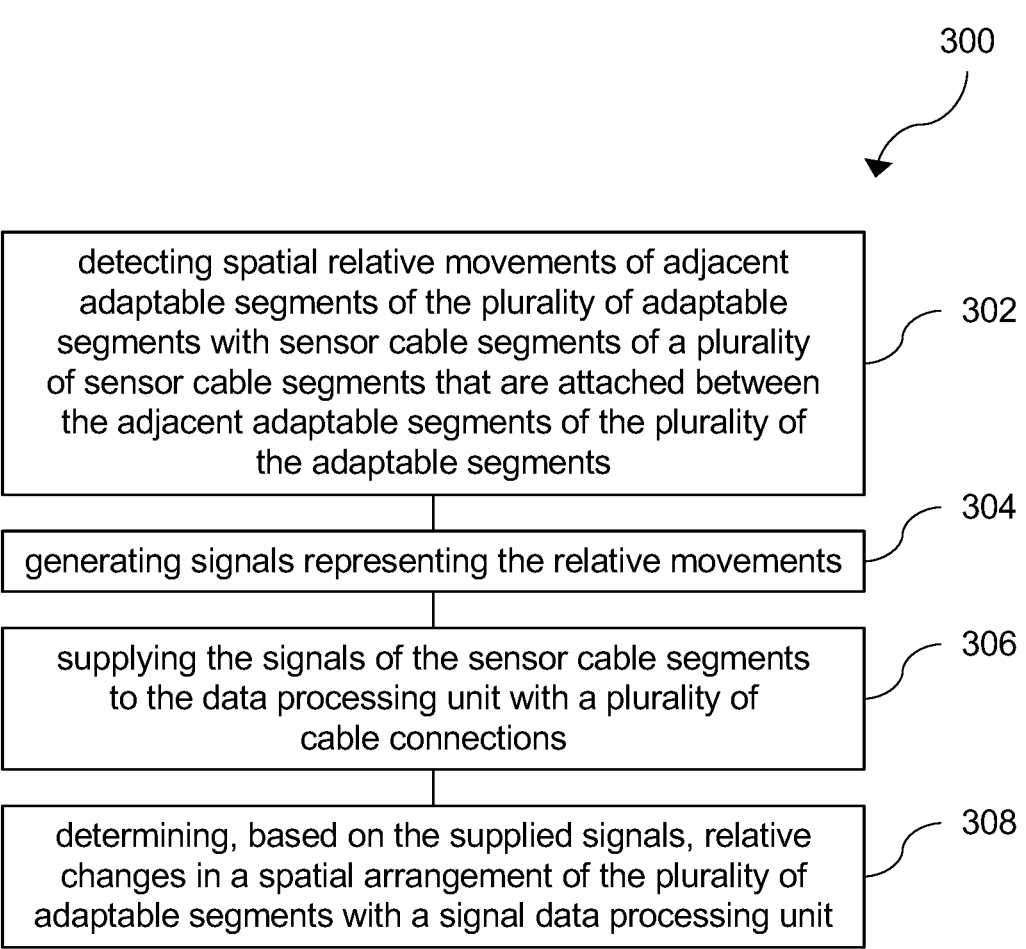
FIG. 5 shows basic steps of an example of a method for monitoring a plurality of adaptable segments of an airfoil.

FIG. 5 shows basic steps of an example of a method 300 for monitoring a plurality of adaptable segments of an airfoil. The method 300 comprises the following steps:

Detecting 302 spatial relative movements of adjacent adaptable segments of the plurality of adaptable segments with sensor cable segments of a plurality of sensor cable segments that are attached between the adjacent adaptable segments of the plurality of the adaptable segments;

Generating 304 signals representing the relative movements;

Supplying 306 the signals of the sensor cable segments to the data processor 16 with a plurality of cable connections; and Determining 308, based on the supplied signals, relative changes in a spatial arrangement of the plurality of adaptable segments with a signal data processor.

In an example, a computer program is provided that comprises instructions which, when the program is executed by a computer, cause the computer to carry out the method of one of the preceding examples. In an example, a computer program or program element for controlling an apparatus according to one of the examples above is provided, which program or program element, when being executed by a processor, is adapted to perform the method steps of one of the method examples above. In an example, a computer readable medium is provided having stored the computer program of the preceding example.

In another example embodiment of the disclosure herein, a computer program or a computer program element is provided that is characterized by being adapted to execute the method steps of the method according to one of the preceding embodiments, on an appropriate system.

The computer program element might be stored on a computer unit or be distributed over more than one computer units, which might also be part of an embodiment of the disclosure herein. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the disclosure herein.

Aspects of the disclosure herein may be implemented in a computer program product, which may be a collection of computer program instructions stored on a computer readable storage device which may be executed by a computer. The instructions of the disclosure herein may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the disclosure herein may be distributed over multiple computers or processors.

This example embodiment of the disclosure herein covers both, a computer program that right from the beginning uses the disclosure herein and a computer program that by an update turns an existing program into a program that uses the disclosure herein.

Further on, the computer program element might be able to provide all necessary steps to fulfil the procedure of an example embodiment of the method as described above.

According to a further example embodiment of the disclosure herein, a computer readable medium, such as a CD-ROM, is presented wherein the computer readable medium has a computer program element stored on it which computer program element is described by the preceding section. A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further example embodiment of the disclosure herein, a medium for making a computer program element available for downloading is provided, which computer program element is arranged to perform a method according to one of the previously described embodiments of the disclosure herein.

It has to be noted that embodiments of the disclosure herein are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure herein has been illustrated and described in detail in the drawings and foregoing description, such illustration and description are to be considered illustrative or exemplary and not restrictive. The disclosure herein is not limited to the disclosed embodiments. Other variations to the disclosed embodiments can be understood and effected by those skilled in the art in practicing a claimed disclosure herein, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

While at least one example embodiment of the invention(s) is disclosed herein, it should be understood that modifications, substitutions, and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A monitoring arrangement for a plurality of adaptable segments of an airfoil, the monitoring arrangement comprising:

a plurality of sensor cable segments, each of which is configured for:

attachment between adjacent adaptable segments of the plurality of the adaptable segments;

detecting a spatial relative movement of the adjacent adaptable segments; and generating a signal representing the relative movement;

a signal data processor configured to determine relative changes in a spatial arrangement of the plurality of adaptable segments based on the signal generated by each of the plurality of sensor cable segments; and a plurality of cable connections configured to supply the signal generated by each of the plurality of sensor cable segments to the data processor;

wherein at least a part of at least one of the plurality of cable connections comprises interconnecting cable segments configured for:

arranging between successive sensor cable segments of the plurality of sensor cable segments; and connecting the successive sensor cable segments to the data processor.

2. The monitoring arrangement according to claim 1, wherein:

the plurality of cable connections connects the plurality of sensor cable segments to the data processor; and the plurality of cable connections connect the plurality of sensor cable segments to a common data bus connection to the data processor.

3. The monitoring arrangement according to claim 1, wherein:

each of the plurality of sensor cable segments comprises a plurality of consecutive sensors configured to detect relative movements of determined consecutive points along a longitudinal extension of the plurality of sensor cable segments; and the plurality of consecutive sensors are configured to detect a relative motion of the two ends of a sensor cable segment.

4. The monitoring arrangement according to claim 1, wherein each of the plurality of sensor cable segments comprises a first and a second sensor segment arranged in a common cable shielding.

5. The monitoring arrangement according to claim 1, wherein the plurality of sensor cable segments and the plurality of cable connections provide a linear arrangement configured for arrangement along an adaptable edge of the airfoil.

6. The monitoring arrangement according to claim 1, wherein:

at least a part of at least one of the plurality of cable connections comprises a second plurality of sensor cable segments; and each of the second plurality of sensor cable segments is configured for:

attachment to one of the adaptable segments;

detecting a spatial deforming of a respective adaptable segment; and generating a second signal representing the spatial deforming of the respective adaptable segment.

7. An adaptable surface configuration for an airfoil, the adaptable surface configuration comprising:

a plurality of adaptable segments mountable to a support structure of the airfoil;

a mechanism for changing locations or shapes of the adaptable segments in relation to the support structure; and the monitoring arrangement according to claim 1;

wherein the plurality of sensor cable segments of the monitoring arrangement are configured to detect relative movement between adjacent segments of the plurality of adaptable segments.

8. An airfoil comprising:

a support structure; and the adaptable surface configuration according to claim 7;

wherein the plurality of adaptable segments is mounted to the support structure; and wherein at least a part of the airfoil has an aerodynamically effective geometry that is adjustable based on changes of the plurality of sensor cable segments.

9. The airfoil according to claim 8, wherein at least one of the plurality of cable connections is along each of the plurality of adaptable segments.

10. The airfoil according to claim 8, wherein:

the plurality of sensor cable segments are attached to adjacent adaptable segments of the plurality of adaptable segments to span a distance between the adjacent adaptable segments;

the plurality of sensor cable segments are each configured to detect a spatial relative movement of the adjacent adaptable segments and to generate a signal representing the spatial relative movement;

wherein each of the plurality of cable connections are configured to supply the signals generated by the plurality of sensor cable segments to the data processor; and wherein the data processor is configured to determine a deviation of a spatial arrangement of the plurality of adaptable segments based on the supplied signals.

11. The airfoil according to claim 8, wherein:

the plurality of adaptable segments are slats along at least a part of a leading edge of the airfoil;

the mechanism comprises a plurality of actuators for moving the slats between a retracted position and a deployed position; and the monitoring arrangement is a slat skew monitoring system.

12. The airfoil according to claim 8, wherein:

the plurality of adaptable segments are flaps disposed in rows or row segments along a trailing edge of the airfoil;

the mechanism comprises a plurality of actuators for moving the flaps between a retracted position and a deployed position; and the monitoring arrangement is a flap monitoring system.

13. An aircraft comprising:

a fuselage; and at least one airfoil according to claim 8;

wherein the at least one airfoil is mounted to the fuselage.

14. A method for monitoring a plurality of adaptable segments of an airfoil, the method comprising:

detecting spatial relative movements of adjacent adaptable segments of the plurality of adaptable segments with sensor cable segments of a plurality of sensor cable segments that are attached between the adjacent adaptable segments of the plurality of the adaptable segments;

generating signals representing the relative movements;

supplying the signals of the sensor cable segments to a data processor with a plurality of cable connections; and determining, based on the supplied signals, relative changes in a spatial arrangement of the plurality of adaptable segments with the data processor;

wherein at least a part of at least one of the plurality of cable connections comprises interconnecting cable segments for:

arranging between successive sensor cable segments of the plurality of sensor cable segments; and connecting the successive sensor cable segments to the data processor.

15. A monitoring arrangement for a plurality of adaptable segments of an airfoil, the monitoring arrangement comprising:

a plurality of sensor cable segments, each of which comprises a first and second sensor segment arranged in a common cable, and each of which is configured for:

attachment between adjacent adaptable segments of the plurality of the adaptable segments;

detecting a spatial relative movement of the adjacent adaptable segments; and generating a signal representing the relative movement;

a signal data processor configured to determine relative changes in a spatial arrangement of the plurality of adaptable segments based on the signal generated by each of the plurality of sensor cable segments; and a plurality of cable connections configured to supply the signal generated by each of the plurality of sensor cable segments to the data processor.

16. An adaptable surface configuration for an airfoil, the adaptable surface configuration comprising:

a plurality of adaptable segments mountable to a support structure of the airfoil;

a mechanism for changing locations or shapes of the adaptable segments in relation to the support structure; and the monitoring arrangement according to claim 15;

wherein the plurality of sensor cable segments of the monitoring arrangement are configured to detect relative movement between adjacent segments of the plurality of adaptable segments.

17. An airfoil comprising:

a support structure; and the adaptable surface configuration according to claim 16;

wherein the plurality of adaptable segments is mounted to the support structure; and wherein at least a part of the airfoil has an aerodynamically effective geometry that is adjustable based on changes of the plurality of sensor cable segments.

18. A monitoring arrangement for a plurality of adaptable segments of an airfoil, the monitoring arrangement comprising:

a plurality of sensor cable segments, each of which is configured for:

attachment between adjacent adaptable segments of the plurality of the adaptable segments;

detecting a spatial relative movement of the adjacent adaptable segments; and generating a signal representing the relative movement;

a signal data processor configured to determine relative changes in a spatial arrangement of the plurality of adaptable segments based on the signal generated by each of the plurality of sensor cable segments; and a plurality of cable connections configured to supply the signal generated by each of the plurality of sensor cable segments to the data processor wherein at least a part of at least one of the plurality of cable connections comprises a second plurality of sensor cable segments; and wherein each of the second plurality of sensor cable segments is configured for:

attachment to one of the adaptable segments;

detecting a spatial deforming of a respective adaptable segment; and generating a second signal representing the spatial deforming of the respective adaptable segment.

19. An adaptable surface configuration for an airfoil, the adaptable surface configuration comprising:

a plurality of adaptable segments mountable to a support structure of the airfoil;

a mechanism for changing locations or shapes of the adaptable segments in relation to the support structure; and the monitoring arrangement according to claim 18;

wherein the plurality of sensor cable segments of the monitoring arrangement are configured to detect relative movement between adjacent segments of the plurality of adaptable segments.

20. An airfoil comprising:

a support structure; and the adaptable surface configuration according to claim 19;

wherein the plurality of adaptable segments is mounted to the support structure; and wherein at least a part of the airfoil has an aerodynamically effective geometry that is adjustable based on changes of the plurality of sensor cable segments.

21. An airfoil comprising:

a support structure; and an adaptable surface configuration comprising:

a plurality of adaptable segments that are mounted to the support structure;

a mechanism for changing locations or shapes of the adaptable segments in relation to the support structure; and a monitoring arrangement for the plurality of adaptable segment, the monitoring arrangement comprising:

a plurality of sensor cable segments, each of which is configured for:

attachment between adjacent adaptable segments of the plurality of the adaptable segments;

detecting a spatial relative movement of the adjacent adaptable segments; and generating a signal representing the relative movement;

a signal data processor configured to determine relative changes in a spatial arrangement of the plurality of adaptable segments based on the signal generated by each of the plurality of sensor cable segments; and a plurality of cable connections configured to supply the signal generated by each of the plurality of sensor cable segments to the data processor;

wherein the plurality of sensor cable segments of the monitoring arrangement are configured to detect relative movement between adjacent segments of the plurality of adaptable segments;

wherein at least a part of the airfoil has an aerodynamically effective geometry that is adjustable based on changes of the plurality of sensor cable segments; and wherein at least one of the plurality of cable connections is along each of the plurality of adaptable segments.

* * * * *